(12) United States Patent
Xie (10) Patent No.: US 12,514,242 B1
(45) Date of Patent: Jan. 6, 2026

(54) INSECT-DESTROYING DEVICE

(71) Applicant: Logicarer Biotechnology (Shenzhen) Co., Ltd, Guangdong (CN)

(72) Inventor: Zhen Xie, Guangdong (CN)

(73) Assignee: Logicarer Biotechnology (Shenzhen) Co., Ltd, Guangdong (CN)

( * ) Notice: Subject to any disclaimer, the term of this patent is extended or adjusted under 35 U.S.C. 154(b) by 0 days.

(21) Appl. No.: 18/901,632

(22) Filed: Sep. 30, 2024

(30) Foreign Application Priority Data

Sep. 5, 2024 (CN) .......................... 202422180806.5

(51) Int. Cl.
*A01M 27/00* (2006.01)
*F41B 11/52* (2013.01)
*F41B 11/66* (2013.01)

(52) U.S. Cl.
CPC .............. *A01M 27/00* (2013.01); *F41B 11/52* (2013.01); *F41B 11/66* (2013.01); *A01M 2200/01* (2013.01)

(58) Field of Classification Search
CPC .............. A01M 27/00; A01M 2200/01; A01M 2200/012; A01M 3/00; F41B 11/641; F41B 11/66; F41B 11/81; F41B 1/00; F41B 3/00; F41B 3/04005; F41B 11/52; F41B 7/006; A63H 33/18; A63H 27/005
USPC ......... 43/124, 132.1; 124/56, 63, 49, 50, 55, 124/64; 102/288, 292, 502, 283, 438
See application file for complete search history.

(56) References Cited

U.S. PATENT DOCUMENTS

| | | | | | |
|---|---|---|---|---|---|
| 347,244 | A | * | 8/1886 | Horton | F41B 11/66 124/64 |
| 1,152,447 | A | * | 9/1915 | Sproull | F41B 1/00 124/50 |
| 3,088,450 | A | * | 5/1963 | Clay | F41B 7/08 446/34 |
| 3,618,584 | A | * | 11/1971 | Pigeon | F41B 7/025 124/19 |
| 4,125,106 | A | * | 11/1978 | Kelly | F41B 3/02 124/17 |
| 4,834,059 | A | * | 5/1989 | Moorhouse | F41B 11/50 124/63 |
| 7,464,701 | B1 | * | 12/2008 | Mendoza | F41B 7/08 124/20.1 |
| 2009/0145412 | A1 | * | 6/2009 | Barish | F41B 11/89 124/1 |

(Continued)

*Primary Examiner* — Joshua J Michener
*Assistant Examiner* — Nicole Paige Maccrate
(74) *Attorney, Agent, or Firm* — ScienBiziP, P.C.

(57) ABSTRACT

The bore channel of the tube barrel includes a first portion and a second portion. The first portion and the second portion are in communication with each other. A cross-sectional area of the first portion gradually decreases from an end close to the elastic bag to an end away from the elastic bag and eventually becomes equal to a cross-sectional area of an end of the second portion away from the exit port. The cross-sectional area of the second portion remains unchanged and is equal to a cross-sectional area of the exit port. when being shot out from the elastic bag, grain ammunition gathers at a connection between the first portion and the second portion, and further rushes toward a bottom of the second portion. Then the exit port is pointed at an insect, so that the grain ammunition is precisely shot at the insect through the exit port.

11 Claims, 10 Drawing Sheets

(56) References Cited

U.S. PATENT DOCUMENTS

| | | | |
|---|---|---|---|
| 2009/0255434 A1* | 10/2009 | Pawloski | A01M 27/00 102/502 |
| 2018/0064092 A1* | 3/2018 | Maggiore | A01M 3/027 |
| 2021/0092945 A1* | 4/2021 | Dillon | A01M 27/00 |

* cited by examiner

INSECT-DESTROYING DEVICE

RELATED APPLICATIONS

This application claims the benefit of priority to Chinese Patent Application Number 202422180806.5 filed on Sep. 5, 2024, in the China National Intellectual Property Administration. The entire contents of the above-identified application are hereby incorporated by reference.

TECHNICAL FIELD

The present application relates to the field of insect killing technologies, and in particular to, an insect-destroying device.

BACKGROUND

In the field of insect killing technologies, conventional insect killing methods such as chemical spray and electric shock equipment have obvious deficiencies. For Example, chemical spray depends on toxic substances and poses long-term threats to the environment and health, while electric shock equipment has potential safety hazards, especially when the equipment is used in home environments. Large air-type insect-destroying devices are powerful, but are costly and require complex operations. A safer and more efficient insect killing device to remedy the above-described deficiencies in accurate killing of small insects, and insect-destroying methods require simpler operations may be needed.

BRIEF DESCRIPTION OF DRAWINGS

For clearer descriptions of the technical solutions in the embodiments of the present technical disclosure or the prior art, the following briefly introduces the accompanying drawings required for describing the embodiments the prior art. Apparently, the accompanying drawings in the following description show merely some embodiments of the present technical disclosure, and persons of ordinary skill in the art may still derive other drawings from the structure shown in these accompanying drawings without creative efforts.

DETAILED DESCRIPTION

The present application provides an insect-destroying device.

Embodiment 1

Referring to FIG. 1 to FIG. 4, in a first embodiment of the present application, the insect-destroying device 100 includes:

a gun body 8, where a tube barrel 2 is movably mounted in the gun body 8, and the tube barrel 2 is provided with a bore channel 2a; and it may be understood that in other embodiments, the tube barrel 2 may be integrally formed with the gun body 8; and an elastic bag 1, where the elastic bag 1 is sheathed at an end of the tube barrel 2, an inner cavity of the elastic bag 1 being in communication with the bore channel 2a, and is configured to shoot ammunition loaded in the elastic bag 1 out of a exit port via the bore channel 2a through air pressure generated in the elastic bag 1. Moreover, a cross-sectional area of the bore channel 2a gradually decreases from an end close to the elastic bag 1 to an end away from the elastic bag 1.

The gun body 8 is a main body and a mounting foundation of the insect-destroying device 100, and is made of a plastic or metal material, thereby ensuring the overall stability and durability.

The tube barrel 2 is a tubular structure inside the gun body 8, and is hollow inside to form the bore channel 2a, and a exit port 2d is formed at an end of the tube barrel 2 away from the elastic bag 1. The bore channel 2a and the exit port 2d are in communication with each other and integrally formed. The elastic bag 1 is sheathed at an end of the tube barrel 2, and has the inner cavity in communication with the bore channel 2a. The elastic bag 1 is made of a high-elasticity material, for example, rubber, and can generate an elastic deformation when a user applies a force and convert stored elastic potential energy into kinetic energy when being released, to push grain ammunition to be shot out at a high speed.

During use, the user loads grain ammunition, for example, salt pellets or sand grains, into an insecticide storing housing 4 of the insect-destroying device 100, and the insecticide storing housing 4 may be in communication with the bore channel 2a. Through the action of gravity, the grain ammunition first drops into the bore channel 2a. The user may erect the insect-destroying device 100. In this case, the elastic bag 1 of the insect-destroying device 100 is closest to the ground, to make the grain ammunition drop from the bore channel 2a into the elastic bag 1. The user pinches the elastic bag 1 and applies a pulling force away from the tube barrel 2, to make the elastic bag 1 generate an elastic deformation to store elastic potential energy. When the user releases the elastic bag 1, the elastic potential energy in the elastic bag 1 is rapidly converted into kinetic energy to push the grain ammunition to be shot out at a high speed along the bore channel 2a to kill a target insect.

Figure 1:
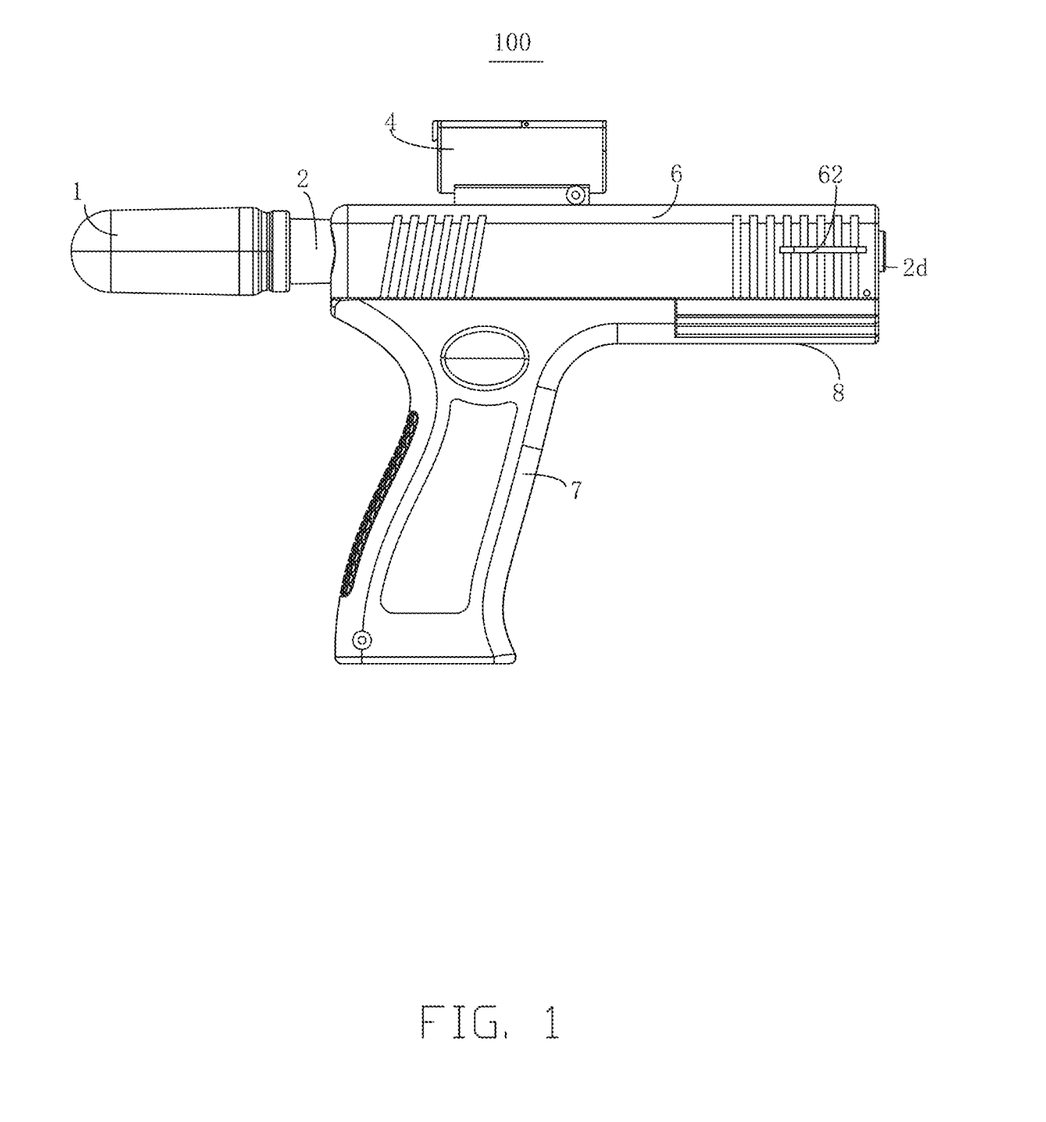
FIG. 1 is a schematic structural diagram of Embodiment 1 of an insect-destroying device provided in the present technical disclosure.
Figure 3:
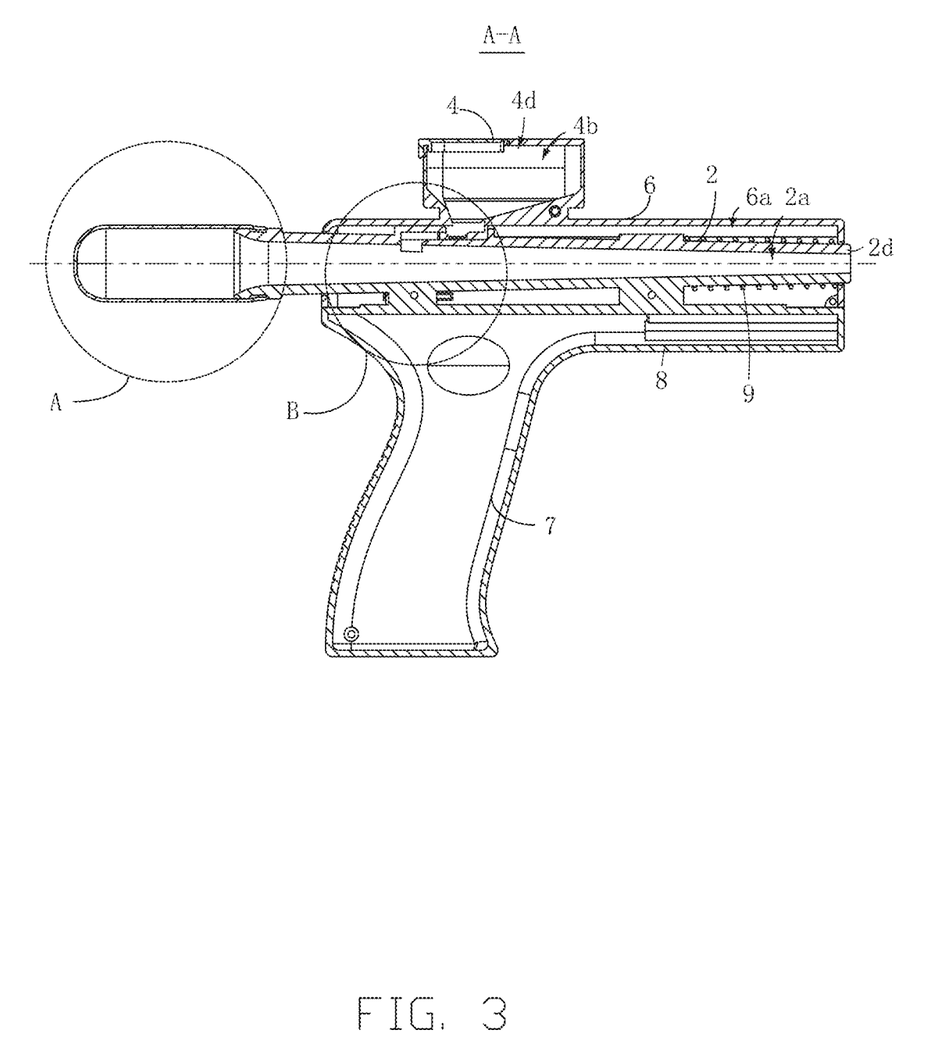
FIG. 3 is a cross-sectional view viewed along A-A in FIG. 2.
Figure 6:
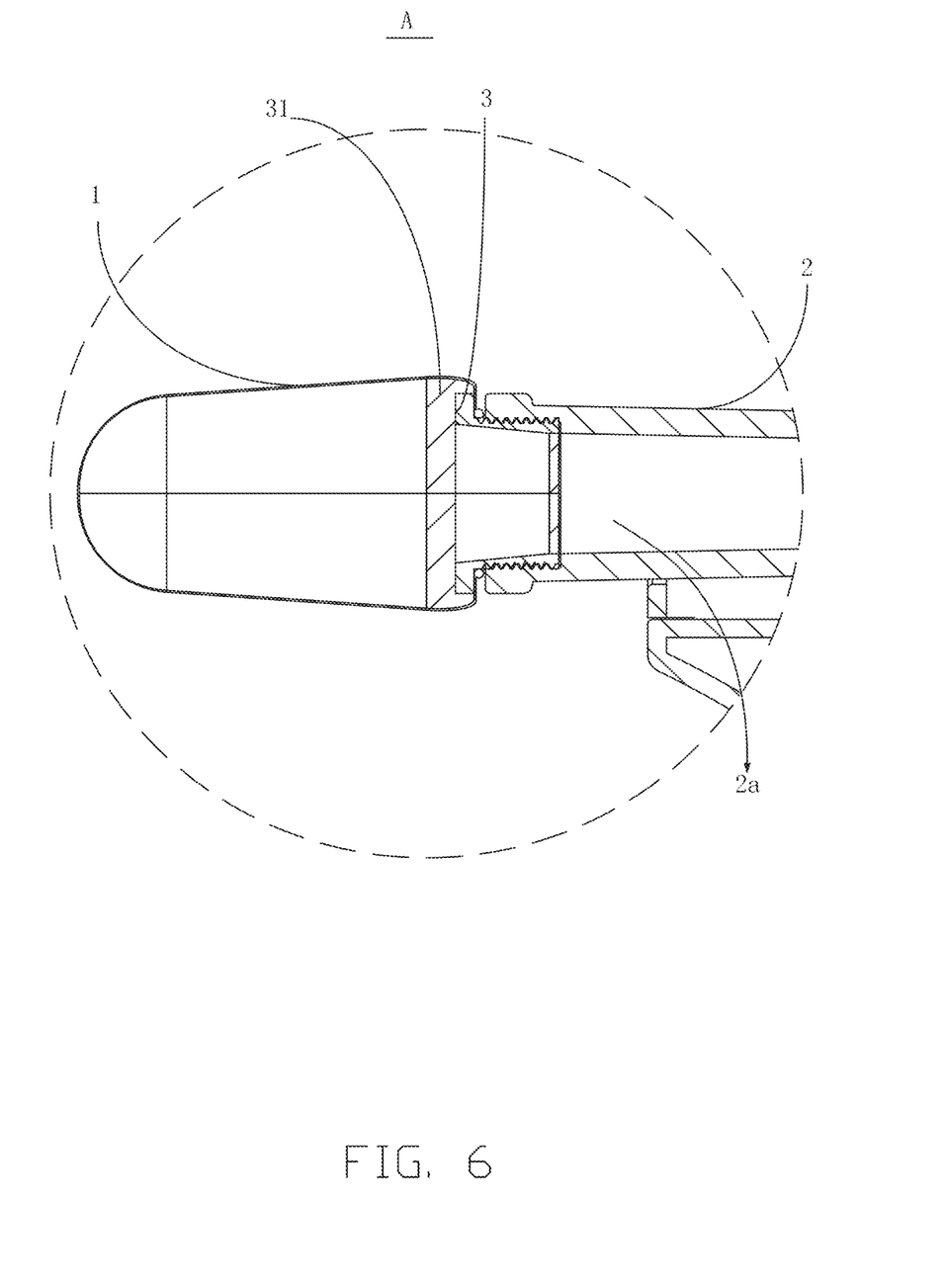
FIG. 6 is a partial enlarged view of another embodiment of the portion A labeled in FIG. 3.

Referring to FIG. 1, FIG. 3, and FIG. 6, in an embodiment of the present technical disclosure, the insect-destroying device 100 further includes a connecting ring 3. The connecting ring 3 connects the tube barrel 2 and the elastic bag 1. A limiting boss 31 is formed at an end of the connecting ring 3 away from the tube barrel 2. The elastic bag 1 is sheathed over the limiting boss 31. A partial structure of the elastic bag 1 is clamped and limited between the limiting boss 31 and the tube barrel 2.

The connecting ring 3 is a connecting member with an annular structure, and is made of plastic or metal, to provide a stable mechanical connection.

The limiting boss 31 is a part designed to protrude from an end of the connecting ring 3. A diameter of the limiting boss 31 is larger than a diameter of an opening of the elastic bag 1, so that the elastic bag 1 can be stably sheathed over the limiting boss 31.

The elastic bag 1 is subjected to the action of the limiting boss 31 of the connecting ring 3, and the elastic bag 1 is fixed on the connecting ring 3, to ensure that a correct position and a correct direction of the elastic bag 1 are kept during shooting of grain ammunition.

A series of uniformly distributed clamping grooves are designed at an outer edge of the connecting ring 3. These clamping grooves are configured to lock the tube barrel 2.

Corresponding protruding buckles are designed at an inner edge of the tube barrel 2. These buckles are retractable metal elastic sheets, and therefore can be inserted in the clamping grooves during connection.

During assembly, the elastic bag 1 is sheathed over the limiting boss 31, to ensure the alignment of the connecting ring 3 of the tube barrel 2, so that the positions of the clamping grooves correspond to the positions of the protruding buckles. The connecting ring 3 is clamped in the tube barrel 2, and the metal elastic sheets are locked in the clamping grooves. In this case, the limiting boss 31 and the tube barrel 2 jointly clamp the elastic bag 1, to make the connection of the elastic bag 1 more stable. At his point, the connection and mounting of the elastic bag 1, the connecting ring 3, and the tube barrel 2 are completed. After the assembly is completed, a necessary functional test, for example, slight twisting or pulling, is performed, to ensure the stability and reliability of the connection. During disassembly, the connecting ring 3 and the tube barrel 2 can be separated by pulling the connecting ring 3 with one hand and pulling the tube barrel 2 with the other hand.

In the insect-destroying device 100, the fixation of the elastic bag 1 is enhanced, and in addition, a reliable locking mechanism is provided, to avoid unexpected separation during use, thereby ensuring the convenience of operations and the safety of use.

Referring to FIG. 1, FIG. 3, and FIG. 6, in an embodiment of the present technical disclosure, external threads are arranged at an end of the connecting ring 3 away from the elastic bag 1, internal threads are arranged at an end of the tube barrel 2 close to the elastic bag 1, and the connecting ring 3 is threaded to the tube barrel 2 through matching of the external threads and the internal threads.

During assembly, the elastic bag 1 is sheathed over the limiting boss 31, and the external threads of the connecting ring 3 are aligned with the internal threads of the tube barrel 2, to ensure that the threads are correctly aligned. The connecting ring 3 is rotated clockwise, to make the external threads of the connecting ring 3 gradually engaged with the internal threads of the tube barrel 2 until the required tightness is reached. In this case, the limiting boss 31 and the tube barrel 2 jointly clamp the elastic bag 1. The stability of the connection is checked, to ensure that there is no trace of loosening or excessive tightening. During the disassembly of the connecting ring 3 and the tube barrel 2, the connecting ring 3 is rotated counterclockwise, to make the external threads gradually disengaged from the internal threads. During the disassembly, a force should be applied with discretion to avoid causing damage to the threads.

The threaded connection provides a strong fastening force, to make the connection between the connecting ring 3 and the tube barrel 2 highly stable, thereby reducing unexpected loosening of the insect-destroying device 100 due to shock or impact during use.

Figure 4:
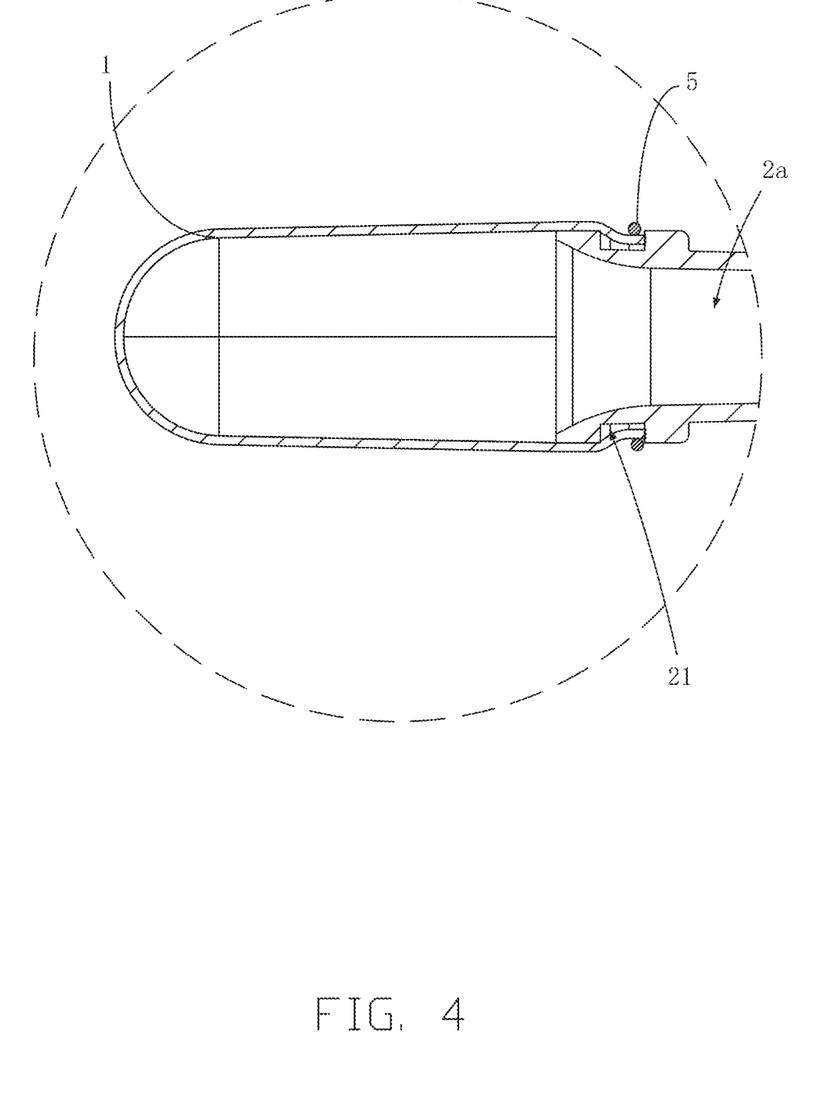
FIG. 4 is a partial enlarged view of a portion labeled A in FIG. 3.

Referring to FIG. 1, FIG. 3, and FIG. 4, in an embodiment of the present technical disclosure, the insect-destroying device 100 further includes at least one annular member 5. A first limiting portion 21 is provided outside the end of the tube barrel 2 close to the elastic bag 1. The first limiting portion 21 is adapted to the annular member 5. The annular member 5 is sheathed over the elastic bag 1 and is arranged at the first limiting portion 21, to fasten the elastic bag 1 and the tube barrel 2.

The annular member 5 has an annular structure, is usually made of rubber, plastic or another flexible material, and has good elasticity and abrasive resistance. An inner diameter of the annular member 5 is smaller than an outer diameter of the tube barrel 2, so that the annular member 5 can be tightly sheathed over the elastic bag 1 mounted at the tube barrel 2.

The first limiting portion 21 is an external structure at the end of the tube barrel 2 close to the elastic bag 1, is usually one or more annular grooves, and is configured to limit the annular member 5.

In this embodiment, first, the elastic bag 1 is sheathed over the tube barrel 2, to ensure that the opening of the elastic bag 1 to be aligned with the bore channel 2a of the tube barrel 2. Next, the annular member 5 is sheathed over the elastic bag 1, and slides along the elastic bag 1 to an edge of the annular member 5 to match the annular groove in the tube barrel 2. After the edge of the annular member 5 is aligned with the first limiting portion 21, the annular member 5 is clamped by the annular groove, to implement the fixed connection between the elastic bag 1 and the tube barrel 2.

A protruding wall of the annular groove used as the first limiting portion 21 may stop the annular member 5 from sliding or displacing on the elastic bag 1. In addition, the annular member 5 can adapt to elastic bags 1 of different sizes through the pliability thereof, thereby improving the universality and adaptability of the design.

Referring to FIG. 1, FIG. 3, and FIG. 4, in an embodiment of the present technical disclosure, the annular member 5 is a rubber ring.

The rubber ring has good pliability and can easily adapt to elastic bags 1 of different sizes, and does not require a customized or specific size like a rigid connecting member. In addition, the rubber ring can provide necessary retractility during sheathing and disassembly through the elasticity, thereby facilitating operations of the user and also keeping the tightness of the connection. If a metal bayonet or adhesive bonding is used, the metal bayonet is not flexible enough, cannot easily adapt to elastic bags 1 of different sizes, requires excessive costs, and has an excessive weight; and the adhesive bonding requires a particular curing time, and is not suitable for quick assembly and disassembly.

In summary, as the connecting member, the rubber ring provides advantages in various aspects such as pliability, cost effectiveness, corrosion resistance, and shock absorption performance in the design of the insect-destroying device 100, and also avoids some common problems in other connection manners.

Figure 2:
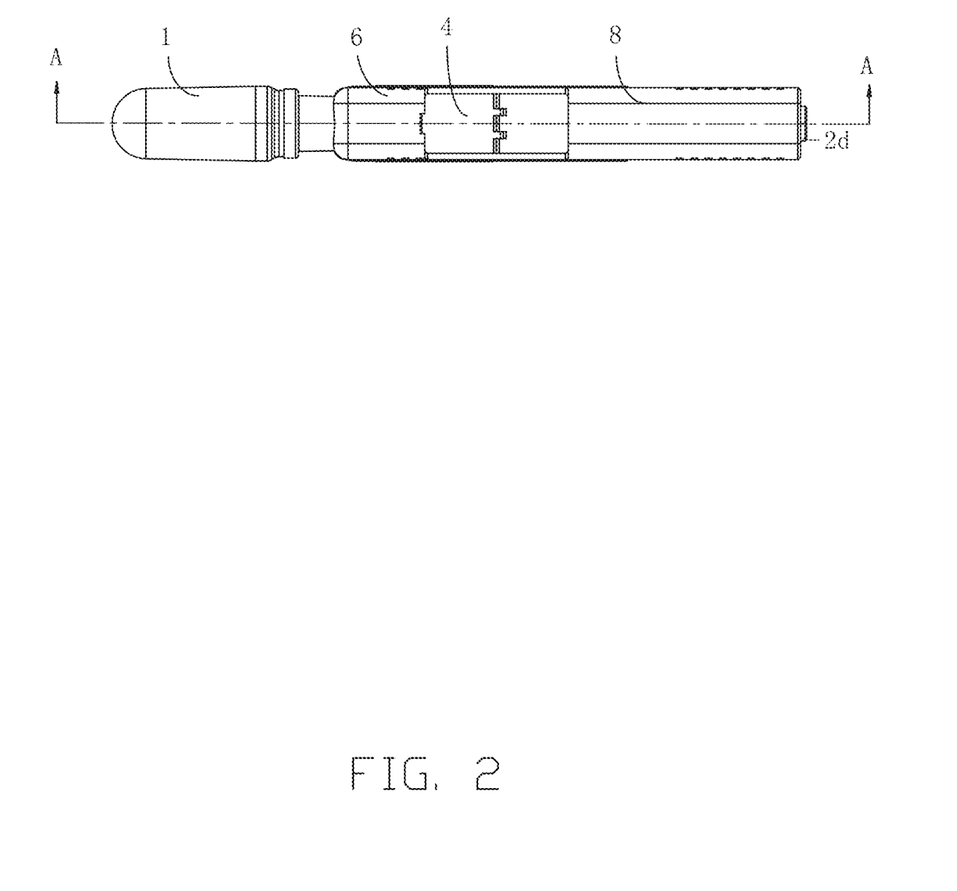
FIG. 2 is a top view of FIG. 1.

Referring to FIG. 1, FIG. 2, and FIG. 3, in an embodiment of the present technical disclosure, the insect-destroying device 100 further includes the insecticide storing housing 4, and the insecticide storing housing 4 is provided with a transparent observation portion.

The transparent observation portion is made of plastic, can withstand wear and impact in daily use, and is not easily susceptible to damage.

In this embodiment, the transparent observation portion allows the user to directly see a remaining amount of ammunition in the insecticide storing housing 4, and does not require opening of the insecticide storing housing 4 or any additional operation, thereby providing a convenient and intuitive monitoring manner. Because the remaining amount of ammunition can be intuitively seen, mis-operations, for example, reloading or trying to shoot when ammunition is exhausted, of the user caused by guessing the remaining amount of ammunition can be reduced.

Figure 5:
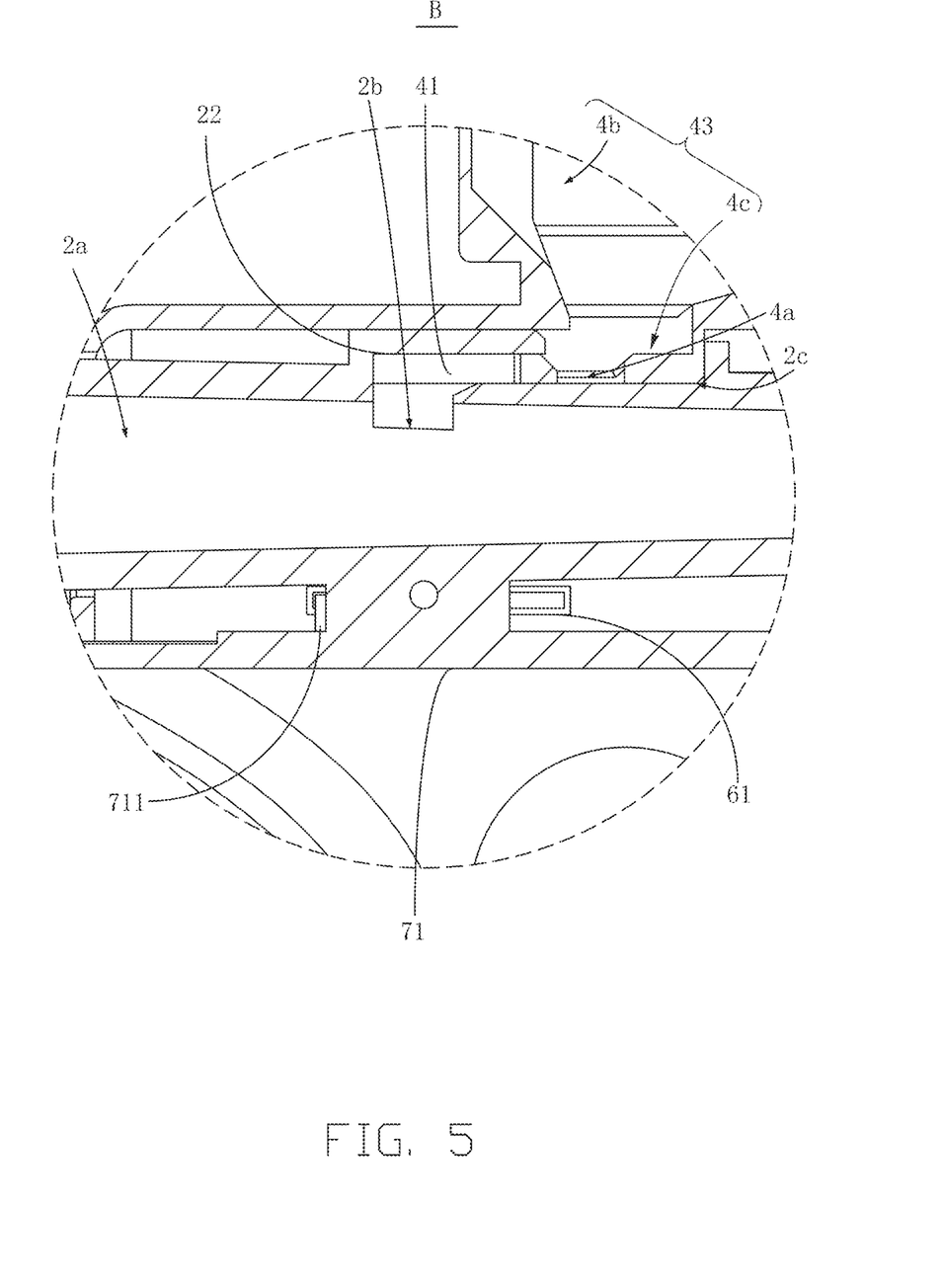
FIG. 5 is a partial enlarged view of a portion B labeled in FIG. 3.

Referring to FIG. 1, FIG. 3, and FIG. 5, in an embodiment of the present technical disclosure, the gun body 8 further includes a sleeve 6 and a grip member 7 arranged at a particular angle. The sleeve 6 and the grip member 7 surround to form a first accommodating cavity 6a. The insecticide storing housing 4 is partially placed in the first accommodating cavity 6a. The insecticide storing housing 4 includes a pellet inlet 4d and two layers of accommodating cavities 43 with unequal volumes that are in communication with each other. The pellet inlet 4d is provided in one layer with the larger volume of the two layers of accommodating cavities 43. Specifically, the two layers of accommodating cavities 43 includes a second accommodating cavity 4b and a second through-hole 4a. The second through-hole 4a extends into the first accommodating cavity 6a. The tube barrel 2 is provided with a first through-hole 2b. The bore channel 2a is in communication with the first through-hole 2b. In an initial state of the insect-destroying device 100, the second through-hole 4a is isolated from the first through-hole 2b. In a loaded state of the insect-destroying device 100, the second through-hole 4a, the first through-hole 2b, and the bore channel 2a are sequentially in communication.

The user first checks the remaining amount of ammunition in the insecticide storing housing 4, to ensure that there is sufficient ammunition for shooting. The user pulls the sleeve 6 with one hand, and holds the grip member 7 with the other hand. In this case, the tube barrel 2 is fixed on the grip member 7 and does not move along with the sleeve 6. With the pulling of the sleeve 6, the insecticide storing housing 4 is driven by the sleeve 6 to slide with respect to the tube barrel 2. In this case, the second through-hole 4a of the insecticide storing housing 4 is aligned with the first through-hole 2b of the tube barrel 2, so that ammunition in the insecticide storing housing 4 enters the bore channel 2a under the action of gravity, and the insect-destroying device 100 is erected to get ready to shoot. After the loading of ammunition is completed, the user pushes the sleeve 6 forward to reset to an original position, and the second through-hole 4a is disconnected from the first through-hole 2b, to ensure that the bore channel 2a is isolated from the insecticide storing housing 4.

The relative sliding mechanism of the sleeve 6 and the tube barrel 2 ensures the smooth loading of ammunition and the sealing of a bore channel 2a, thereby improving the accuracy and reliability of shooting. The user may easily perform ammunition loading and shooting, and the safety and convenience of operations are also ensured.

Referring to FIG. 1, FIG. 3, and FIG. 5, in an embodiment of the present technical disclosure, a sub-cavity 4c is provided at an end of the insecticide storing housing 4 close to the second through-hole 4a. The sub-cavity 4c is formed by the second accommodating cavity 4b being recessed toward the second through-hole 4a, and a cross-sectional area of the second accommodating cavity 4b gradually decreases toward the sub-cavity 4c. The sub-cavity 4c is in communication with the second through-hole 4a and the second accommodating cavity 4b in a direction (i.e., a vertical direction) perpendicular to a length direction of the tube barrel 2, so that grain ammunition flows into the bore channel 2a from the insecticide storing housing 4 under the action of gravity.

The tube barrel 2 protrudes and extends toward the sub-cavity 4c to form a spacer sheet 22. The sleeve 6 extends toward the elastic bag 1 to form an extending portion 41. The extending portion 41 is received in the spacer sheet 22 and abuts against two sides of the spacer sheet 22, to keep grain ammunition from leaking from the two sides of the spacer sheet 22. In addition, after loading is completed, the extending portion 41 covers a top of the first through-hole 2b, so that when grain ammunition is ejected out from the exit port 2d from the elastic bag 1, under the action of elasticity, the grain ammunition can only be sprayed toward the exit port 2d and cannot be sprayed to the insecticide storing housing 4.

Preferably, a baffle sheet guide groove 2c is further provided at an end of the tube barrel 2 close to the insecticide storing housing 4, a bottom end of the sub-cavity 4c abuts against the baffle sheet guide groove 2c, and the sub-cavity 4c can make linear movement in the baffle sheet guide groove 2c. The baffle sheet guide groove 2c is set up opposite to the spacer sheet 22.

In the initial state, the second accommodating cavity 4b, the sub-cavity 4c, and the second through-hole 4a of the insecticide storing housing 4 are in communication, and grain ammunition is stored in these spaces. When the user performs a loading operation, the sleeve 6 is operated to make the second through-hole 4a in communication with the first through-hole 2b. In this case, grain ammunition in the sub-cavity 4c drops into the bore channel 2a through the first through-hole 2b under the action of gravity to get ready to shoot.

Referring to FIG. 1 and FIG. 5, in an embodiment of the present technical disclosure, the sleeve 6 is provided with a second limiting portion 61. The grip member 7 is provided with a first fixing portion 71. The first fixing portion 71 is provided with a third limiting portion 711. The tube barrel 2 is connected to the first fixing portion 71. The second limiting portion 61 matches the third limiting portion 711, to limit linear movement of the sleeve 6.

For the second limiting portion 61, a protrusion is arranged on the sleeve 6. The protrusion may be a cylindrical or a square protrusion, and is configured to match the groove in the third limiting portion 711 on the grip member 7.

For the first fixing portion 71, a fixed structure is designed inside the grip member 7, and is configured to fix the tube barrel 2 and provide stable support.

For the third limiting portion 711, a strip-shaped groove is provided in the first fixing portion 71. The groove extends toward the exit port 2d along the grip member 7, and is configured to guide the protrusion on the sleeve 6 to implement the linear movement.

Preferably, the sleeve 6 is provided with a baffle. The baffle surrounds an end of an opening of the tube barrel 2 away from the elastic bag 1. A spring 9 is sheathed at an end of the first fixing portion 71 close to the exit port 2d of the insect-destroying device 100, and two ends of the spring 9 respectively abut against the baffle and the first fixing portion 71. During loading by the user, the baffle applies a pressure to the spring 9, kinetic potential energy is converted into elastic potential energy, and the spring 9 is compressed. When the user releases the hand, the elastic potential energy of the spring 9 is converted into kinetic potential energy to drive the sleeve 6 to reset. In consideration of that salt pellets used as grain ammunition is prone to wetting to form large blocks of salt getting stuck in a communication portion between the insecticide storing housing and the bore channel, vibration generated when the sleeve resets can shake salt pellets to move, making salt pellets drop into the bore channel smoothly.

It is ensured that the protrusion on the sleeve 6 is correctly mounted, and is aligned with the strip-shaped groove of the grip member 7. A size of the strip-shaped groove is adjusted to ensure tight matching with the protrusion on the sleeve 6. In a process of loading and resetting the sleeve 6 by the user, the protrusion slides in the strip-shaped groove. The matching of the protrusion and the strip-shaped groove implements linear sliding and also limits a movement distance of the sleeve 6, to ensure that the sleeve 6 does not exceed a designed range during loading and resetting.

Referring to FIG. 1 and FIG. 3, in an embodiment of the present technical disclosure, a line 62 indicating a sight line to aim at the insect is arranged on the sleeve 6, the line 62 is arranged on an outer side of the sleeve 6 away from the elastic bag 1, and the line 62 and the bore channel 2a are arranged in a same horizontal plane.

The line 62 and the bore channel 2a are kept in the same horizontal plane, to ensure that the user keeps stable and accurate pointing of the exit port 2d during aiming. In addition, to provide more aiming flexibility, instead of arranging the line 62 on only one side of the sleeve 6, the lines 62 are arranged on both sides. This design provides the user with aiming options in two directions, and the most appropriate line 62 may be selected according to actual use scenarios and personal habits. Either a left-handed or right-handed user can find a suitable scanning manner, thereby improving the comfort and accuracy of shooting.

Embodiment 2

Figure 7:
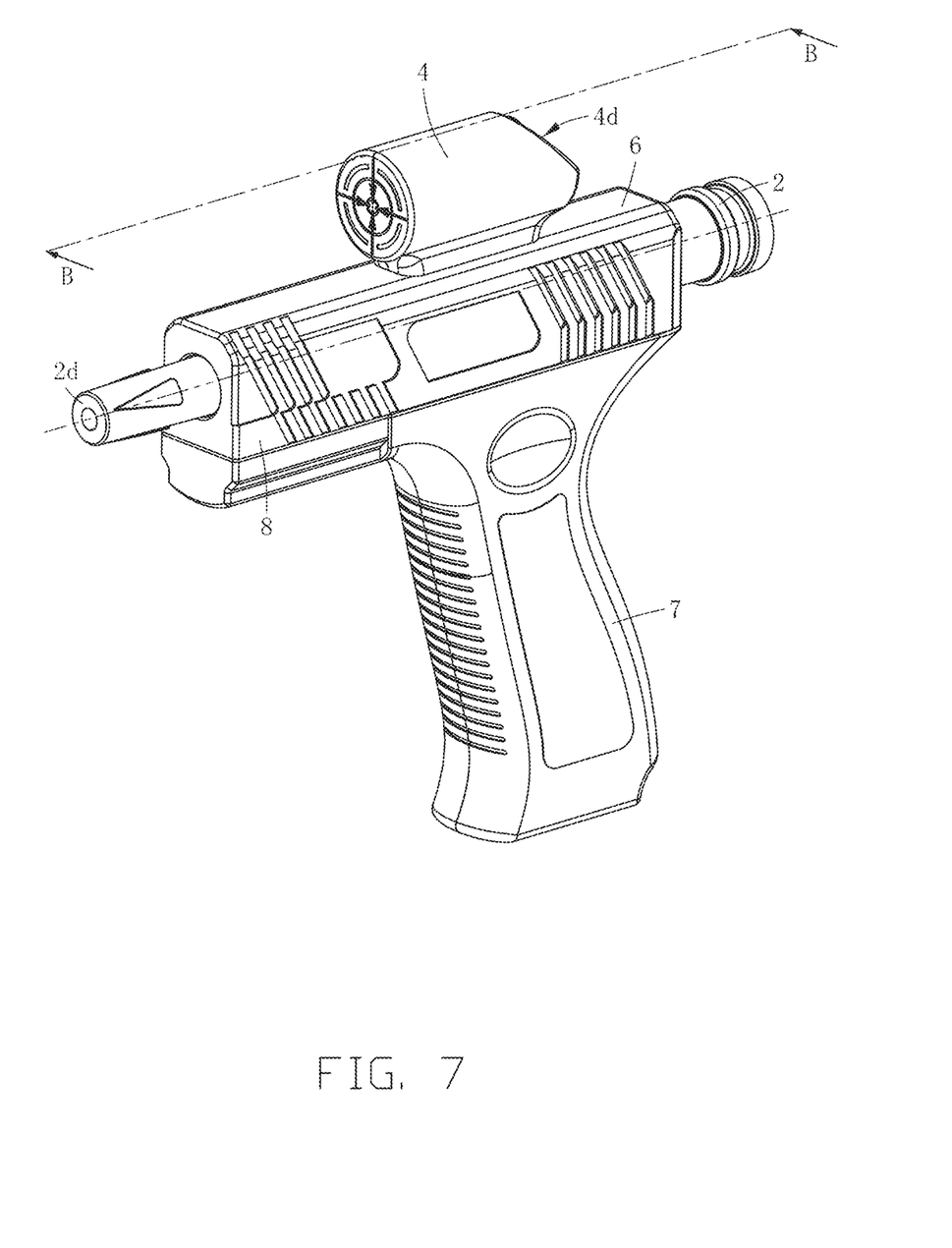
FIG. 7 is a schematic structural diagram of Embodiment 2 of an insect-destroying device provided in the present utility model.
Figure 8:
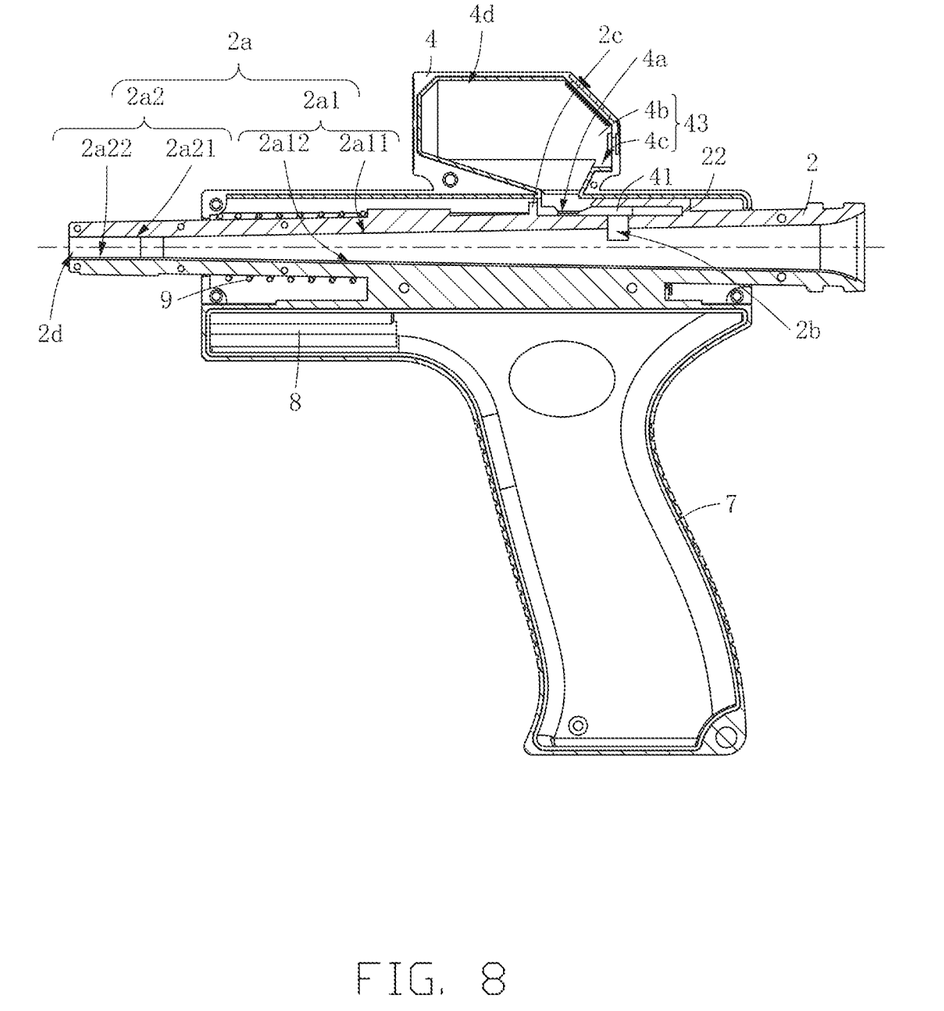
FIG. 8 is a cross-sectional view viewed along B-B in FIG. 7.

Referring to FIG. 7 and FIG. 8, reference numerals same as those in Embodiment 1 continue to be used for same elements in this embodiment. A difference between this embodiment and Embodiment 1 lies in that the bore channel 2a of the tube barrel 2 in this embodiment includes a first portion 2a1 and a second portion 2a2. The first portion 2a1 and the second portion 2a2 both have a cylinder form and are in communication with each other. The first portion 2a1 is mounted on a side close to the elastic bag 1 in the bore channel 2a. The second portion 2a2 is mounted on a side of the first portion 2a1 close to the exit port 2d, and is in communication with the exit port 2d. A cross-sectional area of the first portion 2a1 gradually decreases from an end close to the elastic bag 1 to an end away from the elastic bag 1 and eventually becomes equal to a cross-sectional area of an end of the second portion 2a2 away from the exit port 2d. The cross-sectional area of the second portion 2a2 remains unchanged and is equal to a cross-sectional area of the exit port 2d.

Figure 9:
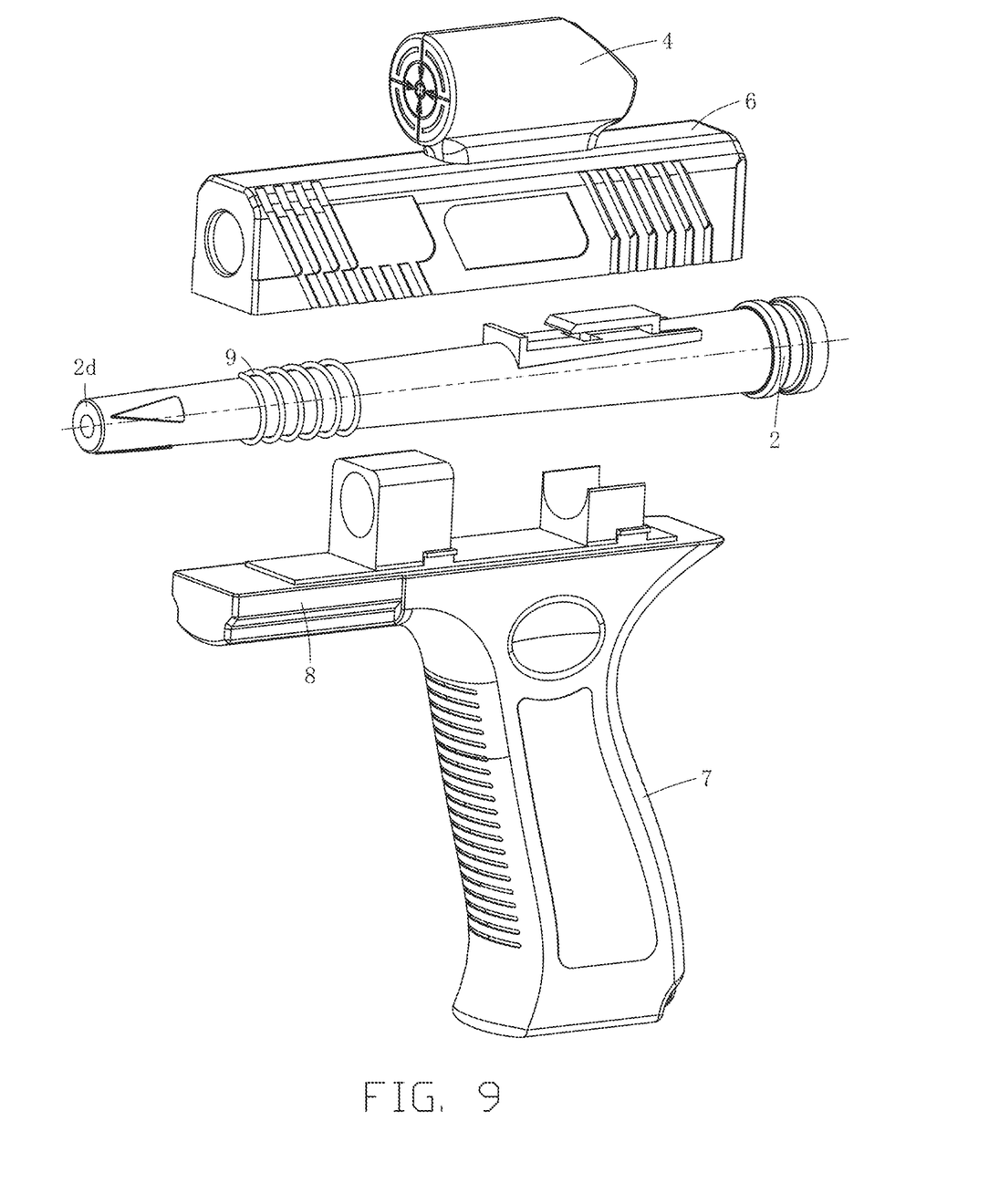
FIG. 9 is an exploded view of FIG. 7.
Figure 10:
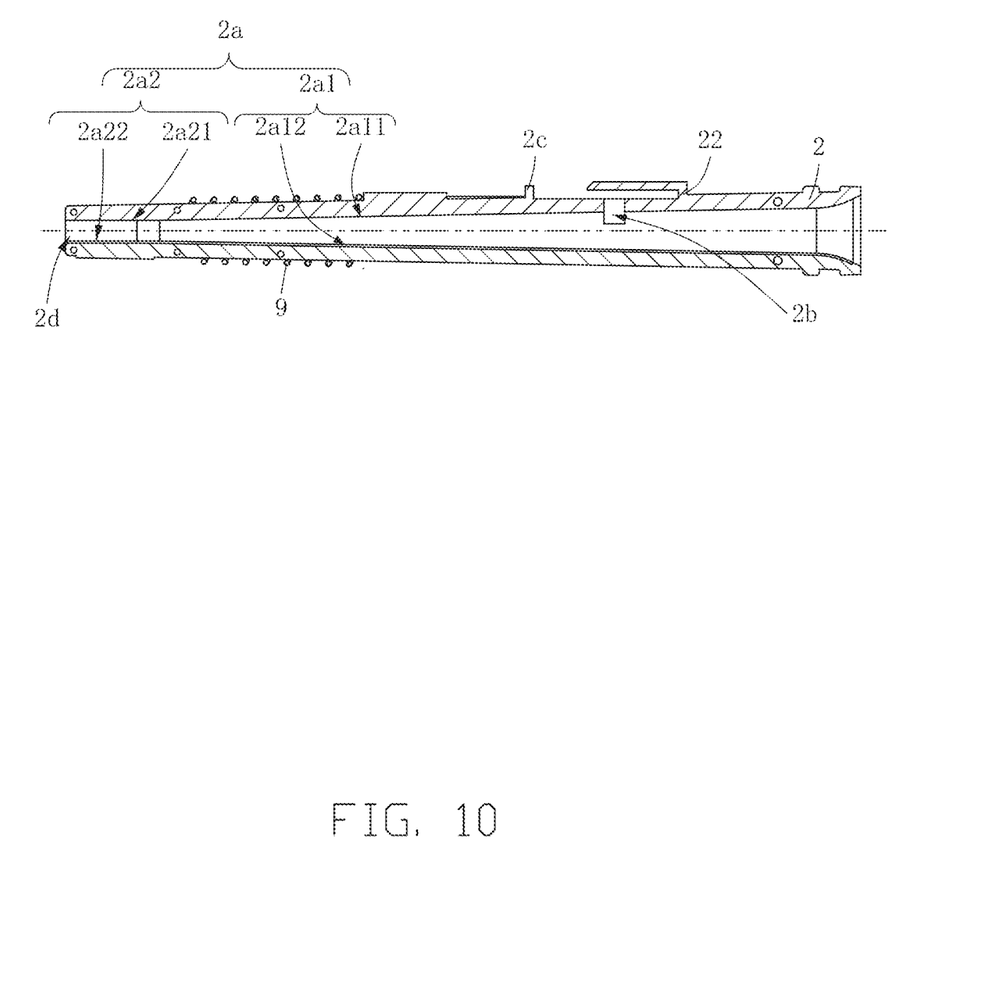
FIG. 10 is a cross-sectional view of a tube barrel in FIG. 9.

Referring to FIG. 9 and FIG. 10, specifically, the first portion 2a1 includes a first upper arc portion 2a11 and a first lower arc portion 2a12 that is arranged opposite to and connected to the first upper arc portion 2a11, and in a vertical direction, a spacing between the first upper arc portion 2a11 and the first lower arc portion 2a12 gradually decreases in a shoot-out direction of grain ammunition. Similarly, the second portion 2a2 of the bore channel 2a includes a second upper arc portion 2a21 and a second lower arc portion 2a22 that is arranged opposite to and connected to the second upper arc portion 2a21, and in the vertical direction, a spacing between the second upper arc portion 2a21 and the second lower arc portion 2a22 remains unchanged in the shoot-out direction of grain ammunition. Therefore, grain ammunition may be kept from being scattered on a side wall of the second portion 2a2 when passing through the second portion 2a2. In other words, when being shot out from the elastic bag 1, grain ammunition gathers at a connection between the first portion 2a1 and the second portion 2a2, and further rushes toward a bottom of the second portion 2a2. In this case, the exit port 2d is pointed at an insect, so that the grain ammunition is precisely shot at the insect through the exit port 2d. In this embodiment, a total length of the bore channel ranges from 15 centimeters to 25 centimeters, and a total length of the second portion 2a2 ranges from 2 centimeters to 5 centimeters. In this case, grain ammunition can gather at the bottom of the second portion 2a2, and is precisely shot at an insect.

In addition, in this embodiment, an end of the tube barrel 2 away from the elastic bag 1 protrudes from the sleeve 6 and extends toward the exit port 2d, and an outer diameter of a part of the tube barrel 2 protruding from the sleeve 6 is smaller than an outer diameter of the sleeve 6. Specifically, a length of the part protruding from the sleeve 6 ranges from 25 cm to 45 cm, so that in a process of holding the gun horizontally to shoot an insect, the insect can be attacked by pointing the exit port 2d protruding from the sleeve 6 at the insect without using the line 62.

What is claimed is:

1. An insect-destroying device, comprising:
at least one of salt pellets or sand grains;
a gun body with a shape of a pistol, having an exit port configured to propel the at least one of salt pellets or sand grains in a propelling direction for killing a target insect, the gun body comprising:
an elongated tube barrel, at least partly received in an inner space of the gun body, and an end of the elongated tube barrel connected to the exit port;
a first through-hole being defined in the elongated tube barrel and configured to communicate with the exit port;
an insecticide storing housing, wherein the insecticide storing housing is disposed at a top side of the elongated tube barrel and is configured to store the at least one of salt pellets or sand grains, a second through-hole is defined in an end of the insecticide storing housing which is adjacent to the elongated tube barrel;
an extending portion extending from the insecticide storing housing to cover the first through-hole; and,
a spacer sheet protruding and extending from a top surface of the elongated tube barrel toward the extending portion and at least partly overlapping with the extending portion, and a receiving space being defined between the top surface of the elongated tube barrel and the spacer sheet;
wherein the insect-destroying device is capable of operating in a loaded state-, in which the second through-hole is shifted to face towards the first through-hole so that the at least one of salt pellets or sand grains stored in the insecticide storing housing enter into the elongated tube barrel via the second through-hole and the first through-hole, and an unloaded state, in which the first through-hole is isolated from the second through-hole, so that the at least one of salt pellets or sand grains stored in the insecticide storing housing are not allowed to enter into the elongated tube barrel; in the unloaded state, the extending portion is partly received in the receiving space, and both the extending portion and the spacer sheet cover the first through-hole, so that the second through-hole is isolated from the first through-hole; in the loaded state, the extending portion moves toward to an end of the gun body far away from the exit port and then is fully received in the receiving space, so that the second through-hole, the first through-hole, and the exit port are in air communication with each other.

2. The insect-destroying device according to claim 1, wherein the end of the elongated tube barrel; far away from the exit port being a first end thereof, is connected to an elastic bag, and a second end of the elongated tube barrel is connected to the exit port, and the elongated tube barrel has a hollow space which extends from the first end to the second end along the propelling direction of the at least one of salt pellets or sand grains, the hollow space defines a bore channel that is in air communication with an interior of the elastic bag and the first through-hole, and comprises a first portion adjacent to the elastic bag, a cross-sectional area of the first portion gradually decreases from the first end.

3. The insect-destroying device according to claim 2, wherein the bore channel further comprises a second portion adjacent to the exit port and is connected to the first portion, the second portion is in air communication with the first portion, and a cross-sectional area of the second portion is constant.

4. The insect-destroying device according to claim 3, wherein a length of the first portion is greater than a half of a length of the bore channel along the propelling direction.

5. The insect-destroying device according to claim 2, wherein the insect-destroying device further comprises at least one elastic annular member, the elongated tube barrel comprises a first limiting portion arranged on an outer wall of the first end of the elongated tube barrel, and the elastic annular member is sheathed over the first limiting portion and cooperates with the first limiting portion to engage the elastic bag.

6. The insect-destroying device according to claim 2, wherein the insect-destroying device further comprises a connecting ring configured to connect the elongated tube barrel and the elastic bag, the connecting ring comprises a limiting boss arranged at an end of the connecting ring away from the elongated tube barrel, the elastic bag is sheathed over the limiting boss, and a portion of the elastic bag is clamped and limited between the limiting boss and the elongated tube barrel.

7. The insect-destroying device according to claim 2, wherein the elastic bag is an air bag.

8. The insect-destroying device according to claim 2, wherein
the elastic bag is configured to undergo elastic deformation when pulled away from the elongated tube barrel, and also to be released to push the at least one of salt pellets or sand grains out through the bore channel and the exit port.

9. The insect-destroying device according to claim 1, wherein the gun body further comprises a handle portion, an upper body portion connected to the insecticide storing housing, and a lower body portion connected to the handle portion, the insecticide storing housing is disposed on the upper body portion, the upper body portion and the lower body portion are assembled with each other to form the inner space of the gun body for accommodating the elongated tube barrel.

10. The insect-destroying device according to claim 9, wherein an upper surface of the lower body portion comprises a first protrusion with a through-hole located at a front position of the elongated tube barrel and a second protrusion with a recessed top surface located at a rear position of the elongated tube barrel; and the front position of the elongated tube barrel passes through the through-hole of the first protrusion and the rear position of the elongated tube barrel is supported by the recessed top surface.

11. The insect-destroying device according to claim 1, wherein a second accommodating cavity is defined in the insecticide storing housing to store the at least one of salt pellets or sand grains, and the insecticide storing housing further comprises a sub-cavity recessed from the second accommodating cavity of the insecticide storing housing toward the second through-hole, and the sub-cavity is in communication with the second accommodating cavity.

\* \* \* \* \*